United States Patent [19]

Sultan

[11] 4,386,900
[45] Jun. 7, 1983

[54] FROZEN FOOD SERVER
[75] Inventor: Jean-Claude Sultan, Marnaz, France
[73] Assignee: M T S International S.A., Annecy, France
[21] Appl. No.: 285,275
[22] Filed: Jul. 15, 1981
[30] Foreign Application Priority Data
  Dec. 8, 1980 [FR] France ................ 80 26497
[51] Int. Cl.³ .............. A23G 9/00; B29C 1/00
[52] U.S. Cl. .................... 425/279; 219/227; 219/240; 425/DIG. 13
[58] Field of Search ............ 425/276–279, 425/187, 221, DIG. 13, 280–282, 458; 219/227, 240, 241, 533

[56] References Cited
U.S. PATENT DOCUMENTS

| | | | |
|---|---|---|---|
| 1,323,523 | 12/1919 | Cox | 425/279 |
| 1,732,502 | 10/1929 | Cox | 425/282 |
| 2,114,703 | 4/1938 | Conner | 425/276 |
| 2,256,770 | 9/1941 | Armstrong | 425/282 |
| 2,715,175 | 8/1955 | Jacobsen | 219/227 |
| 3,264,449 | 8/1966 | Brenner | 219/227 |
| 3,299,838 | 1/1967 | Thietje | 425/279 |
| 3,336,563 | 8/1967 | Hyslop | 174/DIG. 8 |
| 3,476,059 | 11/1969 | Anderson | 425/279 |
| 3,992,604 | 11/1976 | Leddy | 425/279 |

FOREIGN PATENT DOCUMENTS 473497  7/1969  Fed. Rep. of Germany ... 174/DIG. 8

Primary Examiner—Willard E. Hoag
Attorney, Agent, or Firm—Karl F. Ross; Herbert Dubno

[57] ABSTRACT

A frozen-food server comprises a scoop-shaped head of a massive light metal, e.g. aluminum, provided with a cavity in which is lodged a unit formed with an electric heater, the thermostat and electrical controls for the heater, this cavity being formed on a stem of the head which is received in a tubular handle formed by a sleeve through which an electrical conductor passes. According to the invention, a rigid insulating tubular body is interposed between this stem and the sleeve, receives the electrical connection between the heater circuit and the conductor, and also accommodates a thermally shrunk tube which seals the junction.

6 Claims, 2 Drawing Figures

FROZEN FOOD SERVER

FIELD OF THE INVENTION

My present invention relates to a frozen food server and more particularly, to a scoop for the portioning and serving of ice cream, sherberts and other frozen food products.

BACKGROUND OF THE INVENTION

For the most part frozen-food servers for the portioning and dispensing of ice cream, sherberts and, in general, frozen foods provided in bulk form, comprises a scoop-shaped head of hemispherical configuration which can bite into the mass of the frozen comestible as the head is forced into the latter by a handle which can be rigid with this head. The comestible forms a ball within the head and this ball can be dispensed by actuating a lever, pusher, rack-and-pinion mechanism, pivoting element or some other member which releases the ball from the head and enables the same to be deposited as a serving.

The resulting scoop can be placed in an ice cream cone, in a serving cup or anywhere convenient for eating or further distribution.

Such devices create difficulties for the user since manipulation of the actuating mechanism may be difficult if the food is highly frozen, the device cannot be cleaned readily because of the ball-release mechanism, and the mechanism is subject to wear or distortion, rendering the unit unusable.

It has been proposed to shape the scoop head so that it conforms to a configuration other than that of a full hemisphere, thereby making release of the ball depend upon the dexterity of the user, for example when the ball is placed in a cone or the like for dispensing. While such devices are free from many of the difficulties encountered with scoops provided with release mechanisms as described, they also are not fully satisfactory because release of the ball from the scoop may be difficult from time to time and the scoop cannot readily be used by unskilled individuals.

A cumbersome electrically heated ice cream scoop has been developed, this scoop utilizing a resistive heater in heat-transmitting relationship with the scoop-shaped head, a thermostat, a switch, and, of course, an electrical supply conductor connected to the circuit formed by these elements in the handle of the device.

This arrangement was not easy to handle, was comparatively expensive, was simple to clean but could not be safely immersed when cleaning required immersion and had various other defects which prevented widespread acceptance of the unit.

OBJECTS OF THE INVENTION

It is the principal object of the present invention to provide a frozen food server and especially an ice cream scoop which obviates the disadvantages of the earlier devices described.

Another object of the invention is to provide an ice cream scoop of low cost, convenient to use, of high reliability, resistance to wear and capable of being cleaned thoroughly and effectively without danger and in a manner ensuring total hygiene.

SUMMARY OF THE INVENTION

I have found that it is possible to provide an electrically heated ice cream scoop which is convenient to use and of low cost by providing the resistance heater, thermostat and electrical control circuitry in a unit disposed in cavity within a massive light-metal head of the scoop while disposing the connections between this circuit and the line cord within a tubular separator bridging a sleeve forming the handle of the ice cream scoop and a stem of the head, the separator being in a radially spaced position between the stem and the sleeve, the connections within the tubular separator being provided in turn with a thermally shrunk seal.

More particularly, the invention provides an electrical scoop for dispensing frozen foods which comprises, in combination: a massive head composed of a light-metal alloy of high thermal conductivity, e.g. aluminum alloy, having a scoop-forming face and a stem extending away from this face; an electrical heater and a thermostatic control circuit therefor formed as an element received in this stem and having conductors extending out of the stem; an elongated sleeve which surrounds the stem and extends therefrom to form a rearwardly tapering handle, the handle being traversed by a line cord adapted to provide electrical connection with the conductors; and a rigid tubular separator having portions of different diameters and being composed of thermally electrically insulating material, e.g. a silicone rubber or a ceramic, interconnecting the stem (head) and the tubular sleeve. Within a smaller portion of this tubular separator, a thermally shrunk stocking or tube encloses the electrical connections between the conductors and line cord.

The tubular separator thus provides structural stability for the connection, protects the handle, extends excessive heating from the head, and facilitates force transmission between the handle and the head.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
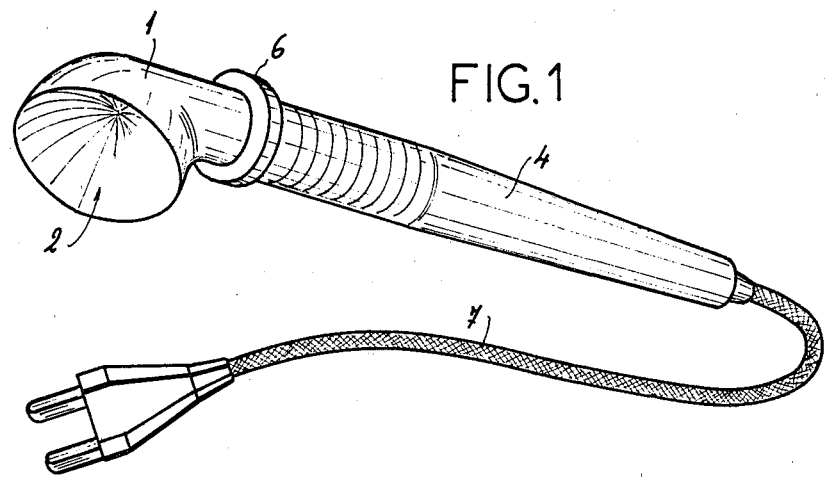
FIG. 1 is a perspective view of an ice cream scoop according to the invention.
Figure 2:
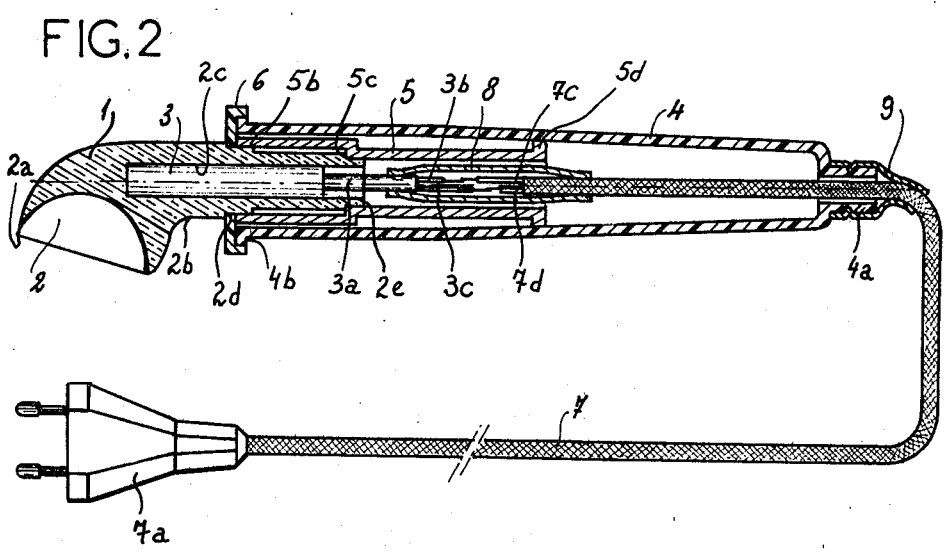
FIG. 2 is a longitudinal section therethrough.

In the drawing, numeral 1 designates a head of the ice cream scoop, which is formed as a massive body of a food-compatible light-metal alloy, such as an aluminum alloy.

The head 1 has a face formed with a substantially hemispheric concavity 2 surrounded by a relatively sharp edge 2a permitting the head to be drawn through a body of ice cream to form balls in the concavity 2 which are more or less spherical.

This head is formed with a stem 2b provided with an axially extending bore 2c in which an element 3 is received, this element including an electrical heater, thermostat and control circuit. A conductor 3a extends axially from the heater 3 and is provided with the leads 3b and 3c. The thermostatic and control elements are thus integrated with the heater in the unit 3.

The head 1 is mounted at the end of a rearwardly tapering tubular sleeve 4 which can be molded from a synthetic resin material such as a polyester plastic, and between the head 1 and the sleeve 4 a stepped tubular separator 5 is provided the latter being rigid and electrically insulating, e.g. being composed of a ceramic material.

A ferrule 6 bridges an outwardly extending flange 4b of the sleeve 4 and a shoulder 2d of an externally recessed portion of the stem 2b to contribute to the connection between the head and the insulating separator 5 which abuts this ferrule.

A greater portion of the tubular separator 5 tightly surrounds the stem 2b and 5b and has an inwardly extending step 5c engaging the free end 2e of the stem. This portion is mainly radially spaced from both the stem 28 and the sleeve 4. At its opposite end, an outwardly extending flange 5d of the separator 5 bears against the inner wall of the sleeve 4.

A line cord 7, provided with a standard plug 7a, passes through a tubular boss 4a and is tightly fitted therein at the remote end of the sleeve 4 and also has conductors 3b and 3c which can be spliced to the conductors 3b and 3c, the connection being protected by a thermally shrunk sleeve 8 forming a sealed connection between the outwardly extending portion of the heating element 3 and electric cord 7. The sleeve 8 and the connection are enclosed in a smaller portion of the separator 5 radially spaced from the sleeve 4.

Another thermally shrunk sleeve 9 hugs the boss 4a and tightly surrounds the cord at the free end of the sleeve 4.

When the plug is inserted into a conventional electric outlet, the head 1 is heated to a temperature which is maintained slightly above the freezing point of a frozen food such as an ice cream, to enable the head to cut rapidly through the mass and form the ball-shaped portion which is readily released. While the temperature of this head may be above 40° C., the temperature of the handle does not rise above the order of 30° to 40° C. at least in part because of the thermal insulation formed by member 5.

The elimination of all mechanical elements for release of the ball of ice cream, eliminates the wear problem. The unit can be operated by vigorous movements without danger and is particularly hygienic. Electric shock dangers are eliminated or reduced.

I claim:

1. A scoop for dispensing ice cream and like frozen comestibles, comprising:
   a massive head composed of a light-metal alloy and having a scoop-shaped concavity adapted to form a ball from a bulk food product, and an elongated stem;
   a thermostatically controlled electric heater formed in a unit received at least partially in said stem and having conductors extending therefrom;
   an elongated sleeve surrounding at least a portion of said stem receiving said unit and extending longitudinally away from said stem to form a handle, said sleeve being radially spaced from said stem;
   a tubular separator surrounding said stem portion and bridging the latter portion and the sleeve in a generally radially spaced position therebetween, said tubular separator and said sleeve being composed of electrically and thermally insulating material;
   a line cord extending through said sleeve and having conductors forming electrical connections with the conductors of said heater; and
   a thermally shrunk tube enclosing said connections.

2. The scoop defined in claim 1 wherein said tube and said connections are disposed within said tubular separator, the latter being composed of rigid and mechanically strong material.

3. The scoop defined in claim 2 wherein said tubular separator includes a first portion of a greater diameter enclosing said stem portion therein, and a second portion of a smaller diameter receiving said tube and said connections, said first portion being radially spaced from said stem between ends tightly secured thereto, said second portion having a free end with a radial projection which is tightly fitted within said sleeve, the latter being tapered rearwardly.

4. The scoop defined in claim 3 wherein said sleeve forming the handle has a front end integral with an outwardly projecting flange which is tightly fitted around the stem and abuts the separator, and a rear end having a boss wherein said cord is tightly enclosed.

5. The scoop defined in claim 4 wherein said flange is tightly received in a circular recess externally provided in said stem.

6. The scoop defined in claim 5 wherein said sleeve is composed of a polyester resin while said tubular separator is made of a ceramic material.

* * * * *